US007821667B2

(12) United States Patent
Bahl et al.

(10) Patent No.: US 7,821,667 B2
(45) Date of Patent: Oct. 26, 2010

(54) VALIDATION OF PRINT CONFIGURATION DOCUMENTS

(75) Inventors: Varun Bahl, Bellevue, WA (US); Ashwin S. Needamangala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 11/502,307

(22) Filed: Aug. 10, 2006

(65) Prior Publication Data

US 2008/0037049 A1 Feb. 14, 2008

(51) Int. Cl.
*G06K 15/00* (2006.01)

(52) U.S. Cl. .................. 358/1.18; 358/1.9; 358/518; 715/514

(58) Field of Classification Search ............ 358/1.18, 358/1.9, 518; 715/514
See application file for complete search history.

(56) References Cited

U.S. PATENT DOCUMENTS

| 7,025,268 B2 | 4/2006 | Alleshouse |
| 2003/0074419 A1 | 4/2003 | VanderDrift |
| 2003/0164957 A1 | 9/2003 | Komaki |
| 2004/0006744 A1 * | 1/2004 | Jones et al. .................. 715/514 |
| 2004/0111418 A1 | 6/2004 | Nguyen et al. |
| 2005/0005233 A1 | 1/2005 | Kays et al. |
| 2006/0023238 A1 | 2/2006 | Blaszyk et al. |
| 2006/0029414 A1 | 2/2006 | Wong |
| 2006/0064420 A1 | 3/2006 | Jin |
| 2006/0285134 A1 * | 12/2006 | Viturro et al. ................ 358/1.9 |

OTHER PUBLICATIONS

Du, Fengdong, "Moving From XML Documents to XML Databases", Mar. 2004, http://www.cs.ubc.ca/grads/resources/thesis/May04/Fengdong_Du.pdf.
Zeremski et al, "Validation of Xml Bibliographic Records in Java Environment", 2003, pp. 111-118,vol. No. 33, Issue No. 2, http://www.emis.ams.org/journals/NSJOM/33_2/rad-12.pdf.
Ziljak et al, "Organizing Digital Normative Provisions as the Base for Simulation of the Post-Press", http://pubwww.srce.hr/~viziljak/VZbiografija/140ZiljakParisEN.htm.

* cited by examiner

*Primary Examiner*—Twyler L Haskins
*Assistant Examiner*—Michael Burleson (57) ABSTRACT

Various technologies for validating print configuration documents are described. In accordance with one described embodiment, print configuration documents are analyzed for conformance to a print schema. The print schema comprises syntactical and structural rules for the print configuration documents. Also, a file is generated to identify portions of the print configuration documents that fail to conform to the print schema.

20 Claims, 9 Drawing Sheets

```
<psf:PrintTicket>

<psf:Feature name="psk:PageMediaSize">
       PrintSchema Keyword elements

<psf:Option name="psk:ISOA4">

<psf:ScoredProperty name="psk:MediaSizeWidth">

<psf:Value xsi:type="xsd:integer">210000</psf:Value>

</psf:ScoredProperty>

<psf:ScoredProperty name="psk:MediaSizeHeight">

<psf:Value xsi:type="xsd:integer">297000</psf:Value>

</psf:ScoredProperty>

</psf:Option>

</psf:Feature>

</psf:PrintTicket>
```

FIG. 3

PrintCapabilities XML

```
<f: PrintCapabilities xmlns: f="http://.../printschemaframework"
Xmlns:k="http://.../printschemakeywords">

<f: Feature name="k: JobStaple">
                <f: Option name="k:None"/>
                <f: Option name="k:StapleTopLeft"/>
                        <f: ScoredProperty name="k:StapleAngle"/>
                                <psf:Value xsi:type="xs:integer">45</psf:Value>
                        </f: ScoredProperty>

...

</f:Feature>
</f:PrintCapabilities>
```

VALIDATION OF PRINT CONFIGURATION DOCUMENTS

BACKGROUND

Conventionally, communications between an application program and a printer driver are limited. For instance, print jobs are often stored in a binary, non-transparent, and non-extensible format, which renders print job formatting inconsistent and non-portable. Furthermore, traditional application programs are unable to ascertain the full capabilities of printer drivers. In one example, a word processing application program may not know that a printer can print out a document in landscape format. As a result, certain functions and/or configurations on printers are often overlooked and/or unused.

In response, efforts have been made to allow communications between application programs and printers to function more effectively. In one example, a print configurations document, such as a print job formatting document, that specifies print job configuration (e.g., paper size, landscape or portrait, and/or resolution) is used to convey user intent to a printer on how a document should be printed. Also, correspondingly, in order to inform a user of the functions that a printer is capable of, a different print configurations document, such as a printer capabilities document, is published to disclose user controllable settings of a printer. In one example, a printer capabilities document may disclose that the printer does not support A4 paper size.

Because both the print job formatting document and the printer capabilities document need to conform to a large set of complex print specification, determination of compliance with the print specification is often quite difficult. Nevertheless, as a single mistake in either the print job formatting document or the printer capabilities document can cause a print job error, it is of great importance for the print job formatting document and the printer capabilities document to conform to the print specification.

SUMMARY

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various technologies for validating print configuration documents are described. In accordance with one described embodiment, print configuration documents are analyzed for conformance to a print schema. The print schema comprises syntactical and structural rules for the print configuration documents. Also, a file is generated to identify portions of the print configuration documents that fail to conform to the print schema.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
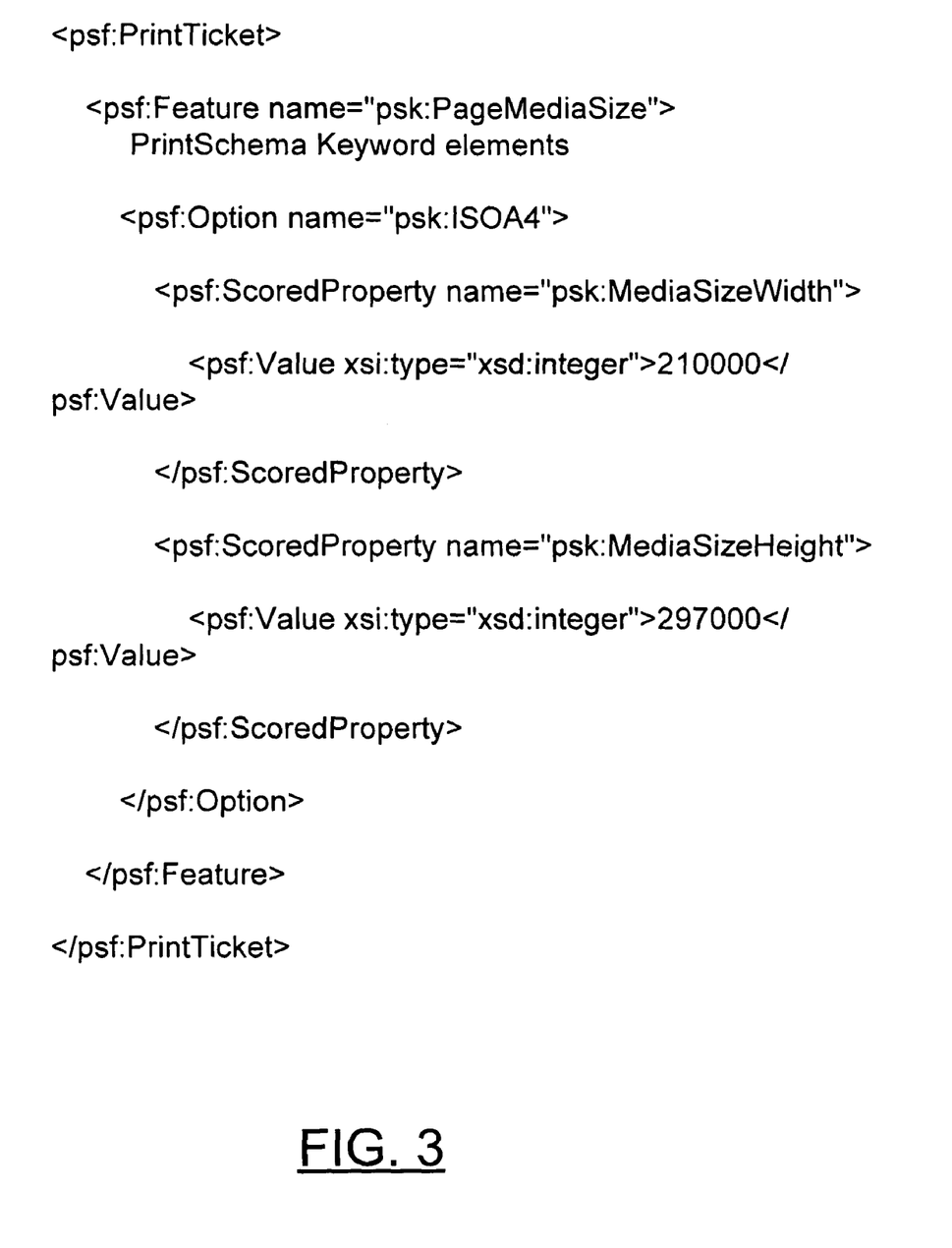
FIG. 3 shows an exemplary PrintTicket document, in accordance with embodiments of the present claimed subject matter.
Figure 4:
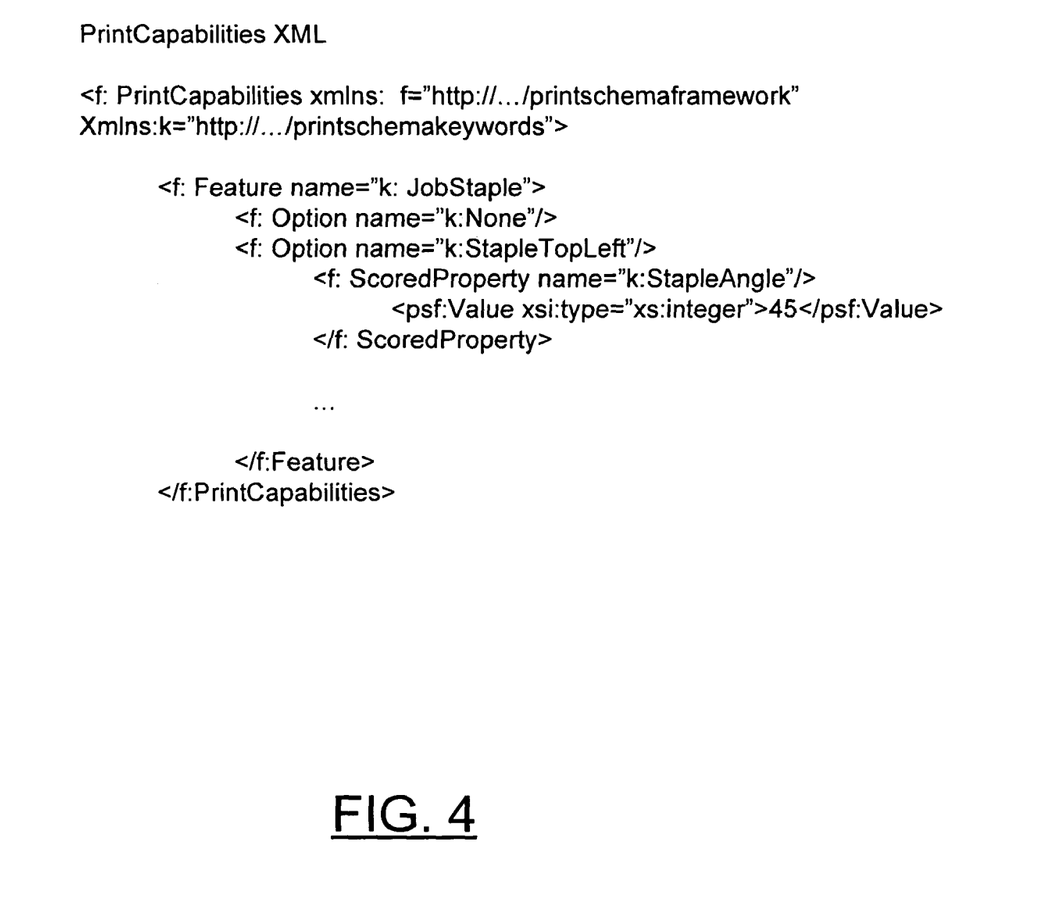
FIG. 4 shows an exemplary PrintCapabilities document, in accordance with embodiments of the present claimed subject matter.

As previously described, it is of great importance for both a print job formatting document and a printer capabilities document to be conformant with print specification. Lack of conformance can cause a print job to fail. Embodiments set forth various technologies for validating print configuration documents (e.g., a PrintTicket document illustrated in FIG. 3 and/or a PrintCapabilities document illustrated in FIG. 4.) The method includes reading print configuration documents and analyzing print schema conformance of the print configuration documents. Moreover, the method includes verifying print schema framework conformance and print schema keyword conformance of the print configuration documents. Embodiments allow print configuration documents (e.g., PrintTicket document and/or PrintCapabilities document) to be efficiently checked for errors. In particular, embodiments allow both software application developers and printer driver developers an easy way to see if the code that corresponds to a new functionality generates Print Schema conformant PrintTicket and/or PrintCapabilities documents.

In an effort to provide context for a more detailed discussion, definitions for terms such as Print Schema, Print Capabilities, Print Ticket, Print Schema Framework, and Print Schema Keywords are described under its individual subsections.

The Print Schema provides an Extensible Markup Language (XML)-based format for expressing and organizing a large set of properties that describe either a print job format or a printer's printing capabilities in a hierarchically structured manner. In the illustrated and described embodiment, the Print Schema is an umbrella term that includes two components, the Print Schema Keywords and the Print Schema Framework.

The Print Schema Framework defines the syntax and semantics used by Print Schema technologies. In other words, the Print Schema Framework is a schema that defines a hierarchically structured collection of XML element types, and specifies how the element types can be used together. The Print Schema Keywords define individual instances of Print Schema Framework elements (i.e. Property, Feature and Option elements etc) that are used to describe printer features and job formatting.

Figure 1:
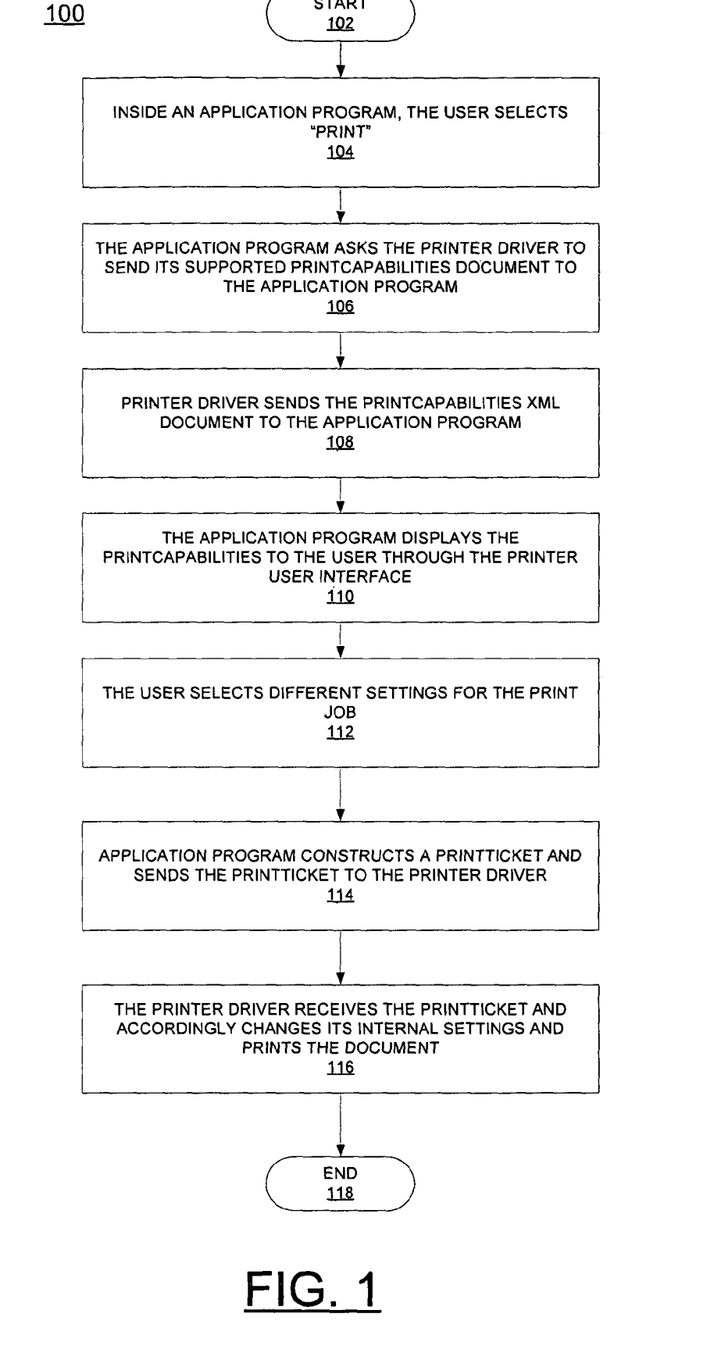
FIG. 1 shows an exemplary flowchart illustrating how print configuration documents are utilized to facilitate printing, in accordance with embodiments of the present claimed subject matter.
Figure 2:
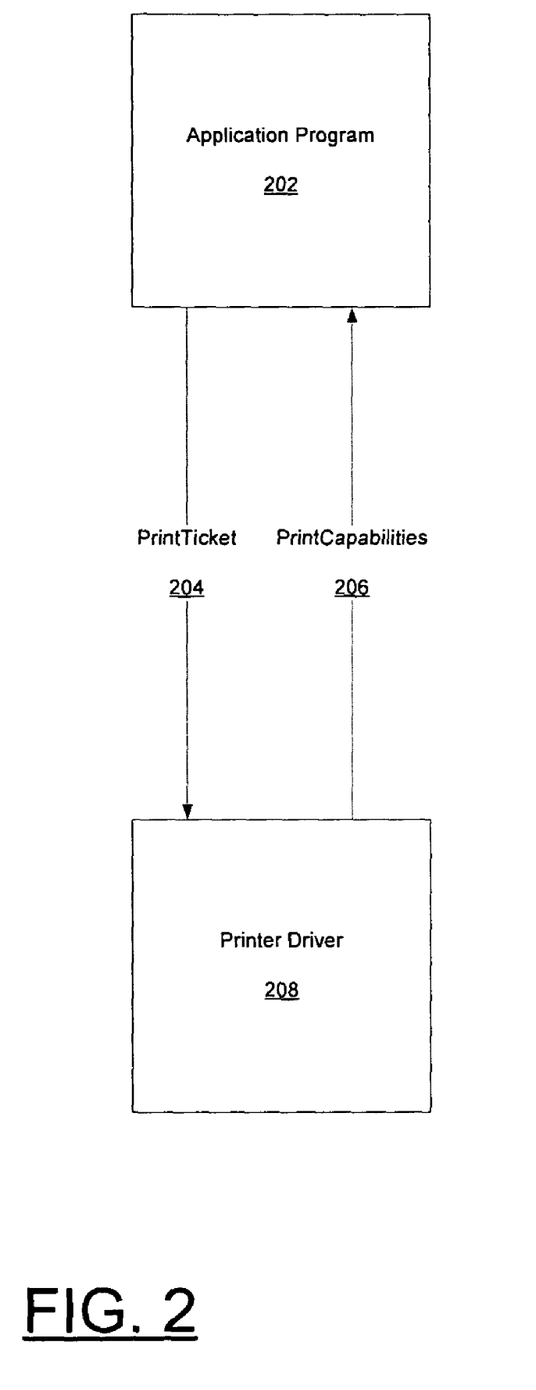
FIG. 2 shows a block diagram of an application program and a printer driver, upon which embodiments of the present claimed subject matter can be implemented.

The Print Schema defines a language that makes PrintTicket and PrintCapabilities documents portable. The Print Schema is also known as the schema. Together, the Print Schema Keywords and the Print Schema Framework form the foundation for two Print schema technologies, the PrintCapabilities and the PrintTicket, which are described in more detail below. In overview, FIG. 1 illustrates an exemplary flowchart of how print configuration documents, such as PrintCapabilities and the PrintTicket, can be utilized to facilitate printing. At block 104, within an application program, such as application program 202 of FIG. 2, a user selects the "print" option. At block 106, the application program (e.g., a word processing program) requests the printer driver, such as printer driver 208 of FIG. 2, to send its supported PrintCapbilities document (e.g., PrintCapbilities 206 of FIG. 2) to the application program. At block 108, the printer driver sends the PrintCapabilities XML document to the application program. At block 110, the application program displays the PrintCapabilities to a user through the printer user interface.

For example, different paper sizes may be displayed. At block 112, the userselects different settings for the print job. At block 114, the application program constructs a PrintTicket (e.g., PrintTicket 204 of FIG. 2) and sends the PrintTicket to the printer driver. At block 116, the printer driver receives the PrintTicket and accordingly changes its internal settings and prints the document.

One of the goals of the Print Schema is to support schema extensions by providers which may include printer IHVs and OEMs. That is, providers are not restricted to using only those Property, Feature, Option, or Parameterinit instances defined in the Print Schema Keywords in the technologies built on the Print Schema Framework. Rather, provider-specific element instances may be freely interspersed within element instances defined in the Print Schema Keywords. The only requirement is that provider-specific (that is, private) Property instances must belong to a namespace that is clearly associated with the provider.

Also, it is important to note that the Print Schema is not limited to an XSD based schema. While an XSD based schema is used for validating XML syntax, the Print Schema, among other functions, provide syntactical and structural guidelines to PrintTicket documents and PrintCapabilites documents. In fact, the Print Schema cannot be completely defined using an XSD. Thus, XML schema technologies like XSD do not suffice to validate a PrintTicket document or a PrintCapabilities document. PrintTicket documents and PrintCapabilities documents can be created by printer drivers and used by application programs (e.g., a word processing application program). In one example, a code that creates or processes PrintTicket or PrintCapabilities documents must comply with the Print Schema. In other words, in order for a printer driver and an application to function together properly, it is necessary for the information flowing between the printer driver and the application to be Print Schema compliant.

As a result, software companies that develop printer driver code or applications that process print jobs need a way to validate that the printer driver code or application are generating Print Schema compliant PrintTicket/PrintCapabilities documents. Consequently, a need exists for technologies that can determine if a PrintTicket document or a PrintCapabilities document conforms to the Print Schema. Furthermore, if PrintTicket document or a PrintCapabilities document fails to conform to the Print Schema, a need exists for technologies that can determine preciously what the deficiencies are.

The Print Schema is intended to address the problems of opaqueness and ambiguity associated with internal communication between the components of the print subsystem, and external communication between the print subsystem and applications. The Print Schema and its related technologies provide a consistent, unambiguous and extensible method of communication of settings and capabilities in a consolidated and logical manner.

The conceptual foundations of the Print Schema Keywords and the Print Schema Framework are consistency, lack of ambiguity and extensibility. Consistency is achieved through the use of the Print Schema Keywords and Print Schema Framework as the building blocks for the communication between printing components. Applications, the Microsoft®.RTM, Windows®.RTM, printing subsystem, and IHV plug-ins and drivers interact using this mechanism. These keywords, their structure and their meaning will be well-defined by the schema. This prevents ambiguity in the meaning of a particular keyword, and prevents redundant or duplicate keywords. All components can rely on using a particular keyword to convey a certain intent and have that intent be well-understood by the recipient. Extensibility facilitates the longevity of the Print Schema Keywords, ensuring that the schema is a dynamic entity. The structure also allows private extensions, which grants independent hardware vendors (IHVs) the flexibility to innovate as desired, keeping in mind future inclusion of a private keyword into the schema is desirable for preserving consistency and preventing ambiguity.

The PrintCapabilities technology is a method of publishing configurable PrintCapabilities. PrintCapabilities are, in one embodiment, published in a plain-text Extensible Markup Language (XML) document called the PrintCapabilities document, that consists of terms defined in the Print Schema Keywords and private extensions. This document describes all of the configurable PrintCapabilities currently available on the device, such as finishing options and page layout options. In other words, a printing device that is described by PrintCapabilities can often be placed in a number of different printing configurations by changing the settings for the features supported by it. Few examples of different features which are typical for printers include duplex printing, resolution, paper size, color mode. The PrintCapabilities document explicitly describes all attributes of the device and the allowable settings for each attribute. Through the use of the Print Schema Framework, device attributes can be precisely described and efficiently compared. The user, in one example, can select a particular configuration by assigning a specific setting to each of the available features (e.g., Duplex: One-Sided, Resolution: 600 dpi, and PaperSize: A4). By using the keywords contained in the Print Schema Keywords document, and the structure defined in the Print Schema Framework, devices can enable clients to more effectively use PrintCapabilities.

Relative to the print subsystem in Microsoft®.RTM., Windows®.RTM., Server 2003 and earlier, the PrintCapabilities technology allows client and print subsystem components to transparently view the information contained in the current Microsoft® Win32®.RTM. system binary PrintCapabilities. This enables the client to query PrintCapabilities, receive a consistent and well-understood XML snapshot, and use it to construct a PrintTicket.

A PrintTicket is an XML document which contains print job settings for a particular print job as set by a user or an application program (e.g., a word processing program). A PrintTicket is generally constructed for a print job by consulting the PrintCapabilities for the printer. The PrintTicket technology, which is intended to replace the use of the current DEVMODE structure, is an XML method of specifying and persisting job formatting and device configuration information. A PrintTicket instance is, in one embodiment, a plaintext XML document that assigns particular settings for device attributes, and conveys user intent. There are two types of PrintTicket: generic PrintTicket, which are not generated for a particular device; and device-specific PrintTicket, which are constructed for a particular device. Generic PrintTicket, which are intended to be portable across devices, derive their contents by selecting settings for each of the device attributes described exclusively in the Print Schema Keywords. Device-specific PrintTickets derive their contents from a PrintCapabilities document, selecting settings for each device attribute advertised by this document. These PrintTickets may also include private extensions, specific to one device model or device model family.

Relative to the current print subsystem, the PrintTicket technology enables all components and clients of the print subsystem to have transparent access to the information currently stored in the public and private portions of the DEVMODE structure, using a well-defined XML format. This design resolves current problems encountered in driver upgrade or downgrade and driver mismatch scenarios in drivers designed for the PrintTicket technology. These scenarios can currently result in a loss of settings and hence a negative customer experience. The PrintTicket also enables new scenarios, such as enabling a printer driver to expose its private DEVMODE settings to applications and custom plug-ins in a consistent and unambiguous manner. This enables printing components to be more transparent and handle settings migrations more cleanly. The PrintTicket interfaces will be exposed to applications through methods on managed code objects that will also be available to scripts. In the new application framework built on managed code objects in Microsoft®'s "Vista®", and also in the Win32 native code platform in Microsoft®'s "Vista®", the PrintTicket is the standard way of describing document settings.

The Print Schema Framework defines the syntax and semantics used by Print Schema technologies (e.g, PrintTicket and PrintCapabilities). At a high level, the Print Schema framework offers two different styles of describing a device attribute: as a Feature/Option construct, or as a parameter construct. If a device attribute has a small number of available values or states, then the attribute should be characterized as a Feature with the allowed values or states referred to as Option elements. Conversely, if a device attribute has a large number of available values or states and the set of all possible values is easily defined without resorting to explicit enumeration, the device attribute should be characterized as a parameter. (A parameter is defined by means of a ParameterDef element, and a parameter instance is initialized by means of a Parameterinit element.) Property and Attribute elements are used within Feature/Option and parameter constructs to provide a finer level of differentiation.

Print Schema Keywords define the individual instances of Property, Feature, and Option elements that are used to describe devices and job formatting. Print Schema Keywords define a language that makes PrintTicket and PrintCapabilities documents portable. It is also referred to as the schema.

In the following sections, systems and methods for improving application to printer driver communication are described. In response to the traditional binary and non-extensible methods of communication, a Print Schema is presented and constitutes the communication language between applications and printers. The Print Schema is built on a framework (e.g., Print Schema framework) that uses schema keywords (e.g., Print Schema keywords) to express the full set of user configurable capabilities (e.g., papersize and/or print resolution) for a particular printer. In the illustrated and described embodiments, the Print Schema utilizes a hierarchical structure that allows different levels of granularity in expressing a printer's capabilities.

In the discussion that follows, the Print Schema and its use is described in the context of a printing system that includes a printing device that utilizes a Print Schema to describe its capabilities to an application. In these embodiments, the Print Schema constitutes the communication language between applications, print subsystem components and devices. Print system components include, by way of example and not limitation, printer drivers, and future filter pipeline filters, and the like. It is to be appreciated and understood, however, that the schema and its use is not to be limited to only the printing environment. Accordingly, principles of the schema and its use can be applied in environments other than printing environments without departing from the spirit and scope of the claimed subject matter.

In the discussion that follows, printer capabilities are published or described in a plain-text hierarchically-structured document referred to as the "PrintCapabilities" document. In one embodiment, the hierarchically structured document comprises an XML document. The PrintCapabilities document comprises terms defined in the Print Schema keywords and private extensions. Printers or printer drivers generate a PrintCapabilities document of their current set of configurable options when queried by clients, which can be either applications or the printing subsystem. In the described embodiment, the PrintCapabilities document explicitly describes all attributes of the printer and the allowable settings for each attribute. Through the use of the Print Schema framework, printer attributes can be precisely described and efficiently compared. By using key words contained in the Print Schema keywords document and the structure defined in the Print Schema framework, printers can enable clients to more efficiently use printer capabilities.

Figure 5:
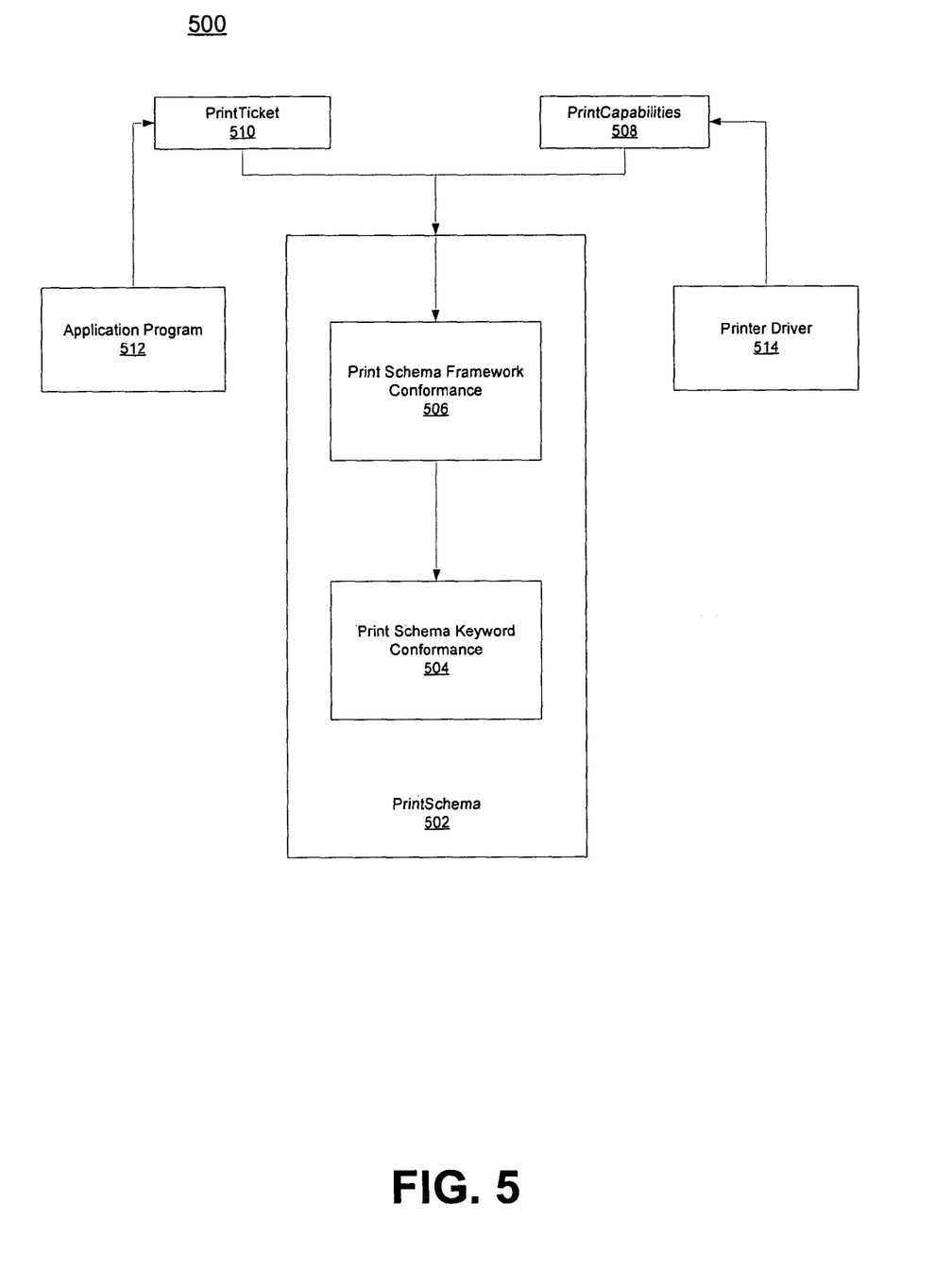
FIG. 5 illustrates a block diagram of a print schema conformance system, upon which embodiments of the present claimed subject matter can be implemented.

FIG. 5 illustrates a block diagram of a Print Schema conformance system 500, upon which embodiments of the present claimed subject matter can be implemented. Print Schema conformance system 500 includes PrintTicket 510, PrintCapabilities 508, Print Driver 514, Application Program 512, and Print Schema 502, which includes Print Schema Framework Conformance 506 and Print Schema Keyword Conformance 504. Also, although system 500 is shown and described as having certain numbers 'and types' of elements, the present claimed subject matter is not so limited; that is, system 500 may include elements other than those shown, and may include more than one of the elements that are shown.

Print Schema conformance system 500, in one example, can be utilized by software developers to test the conformance of PrintTicket documents and PrintCapabilities documents generated by application programs, such as application program 512, and print driver, such as print driver 514. Specifically, a software developer, in one example, can use their Print Schema processing code to generate PrintTickeVPrintCapabilities content and use Print Schema conformance system 500 to verify that their code is processing PrintTicket content properly.

In one example, a software application developer adds a printing functionality to an application program (e.g., application program 512). Also, the software application developer writes a code that parses and displays PrintCapabilities (e.g., PrintCapabilities 508) received from a printer driver (e.g., printer driver 514). Also, the code is capable of constructing a PrintTicket (e.g., PrintTicket 510) that is sent down from the application program (e.g., application program 512) to the printer driver (e.g., printer driver 514). In order to test the code, the software application developer can generate a number of PrintTicket using the code and processes it using Print Schema conformance system 500 to determine if the PrintTicket generated by the code are structurally and syntactically conformant. In one example, a PrintTicket (e.g., PrintTicket 510) is processed by a Print Schema Framework Conformance component 506 and a Print Schema Keyword Conformance component 504. Thus, the Print Schema conformance system 500 allows a software application developer to efficiently determine whether its code for a printing functionality is generating structurally and syntactically conformant PrintTicket documents.

Similarly, a printer driver developer can benefit from the Print Schema conformance system 500. In one example, a printer driver developer has written a new code that adds a new functionality to the printer driver (e.g., printer driver 514). The printer driver developer can use the new code and generate a series of PrintCapabilities documents (e.g., PrintCapabilities 508) and run it through the Print Schema conformance system 500 to determine if it is structurally and syntactically conformant.

Figure 6:
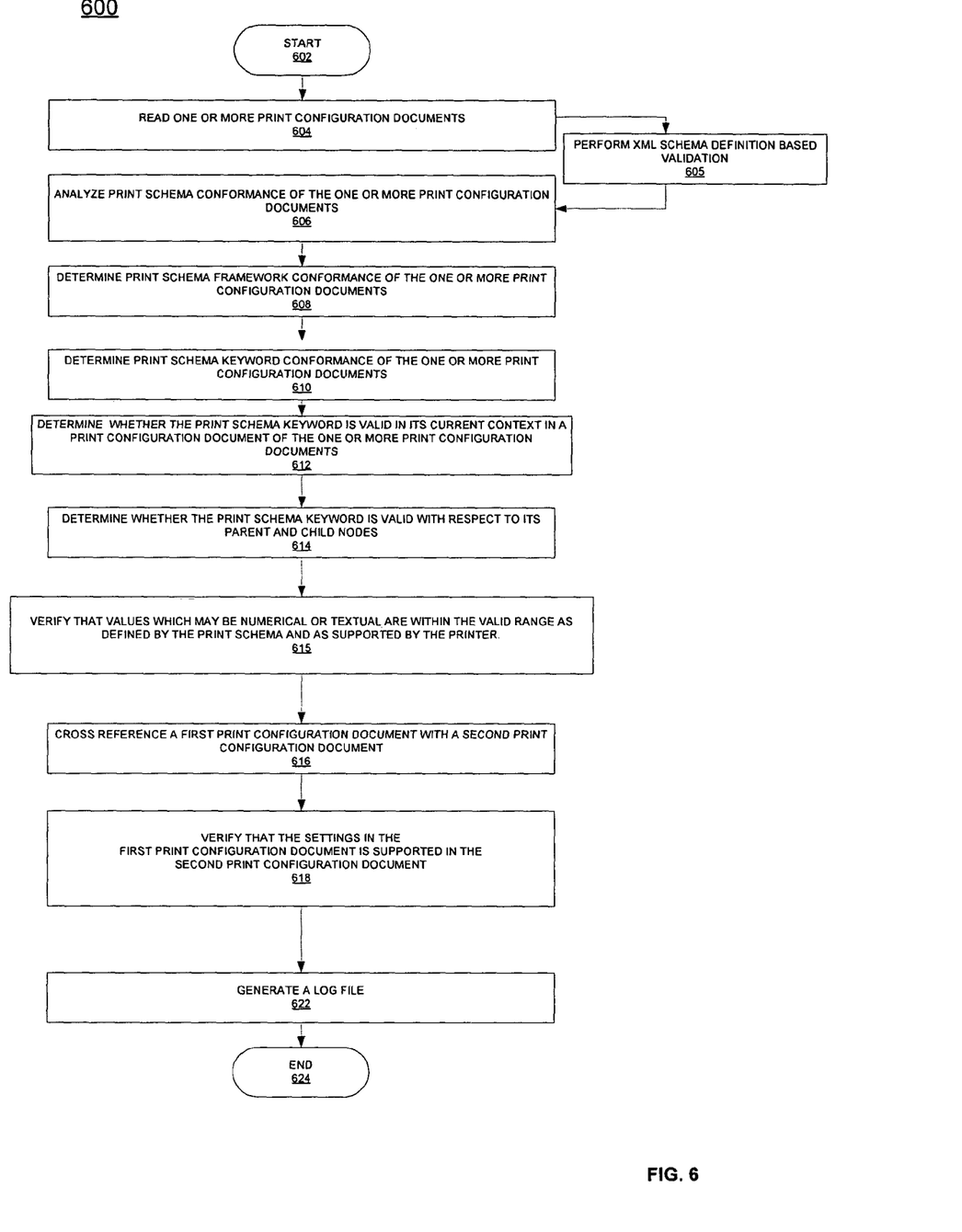
FIG. 6 illustrates a flowchart for validating print configuration documents, upon which embodiments in accordance with the present claimed subject matter can be implemented.

FIG. 6 illustrates a flowchart 600 for validating print configuration documents upon which embodiments in accordance with the present claimed subject matter can be implemented. Although specific steps are disclosed in flowchart 600, such steps are exemplary. That is, embodiments of the present claimed subject matter are well suited to performing various other or additional steps or variations of the steps recited in flowchart 600. It is appreciated that the steps in flowchart 600 can be performed in an order different than presented. At block 602, the process starts.

At block 604, one or more print configuration documents (e.g., a PrintTicket document and/or a PrintCapabilities document) are read. In one embodiment, the print configuration documents are read node by node (e.g., XML node) to ensure that each node is an element that conforms to the Print Schema framework. In one embodiment, the print configuration documents are XML documents. In one embodiment, the print configuration documents are hierarchically structured.

At block 605, XML schema definition based validation is performed. In one embodiment, each of the print configuration documents is analyzed to determine whether it conforms to XML schema.

At block 606, Print Schema conformance of the print configuration documents are analyzed. In one example, Print Schema includes syntactical and structural rules for the one or more print configuration documents. At block 608, it is determined whether the print configuration documents conform to the Print Schema framework. At block 610, it is determined whether the print configuration documents conform to the Print Schema keyword.

At block 612, it is determined whether the Print Schema keyword(s) are valid in its current context in the XML document. At block 614, it is determined whether the Print Schema keyword(s) are valid with respect to its parent and child nodes. At block 615, it is verified that values which may be numerical or textual are within the valid range as defined by the Print Schema and as supported by the printer.

At block 616, a first print configuration document (e.g., PrintTicket) is cross referenced with a second print configuration document (e.g., PrintCapabilities). At block 618, it is verified that the settings in the first print configuration document is supported in the second print configuration document. Specifically, in one example, if a PrintTicket states that a document is to be printed in A4 format but the PrintCapabilities indicates that the printer does not support A4, an error message is generated to alert the user.

At block 622, a file, such as a log file, is generated. In one embodiment, the file has detailed test analysis information for each Print Schema framework element and Print Schema keyword element. Errors found during the test run are logged in the file. Conveniently, the file specifically identifies sections or portions of the print configuration document that fails to conform to the Print Schema. As a result, a software developer can inspect the file to determine whether the PrintTicket is conformant to the Print Schema. If there are error statements in the file, it means that the PrintTicket is not conformant. The error statements in the file specify precisely what the error is to aid the software developer in understanding and correcting the error. In one example, a software developer can look at the file (e.g., log file) to easily identify where and how many sections of the code are failing to comply with the Print Schema. At block 624, the process ends.

Figure 7:
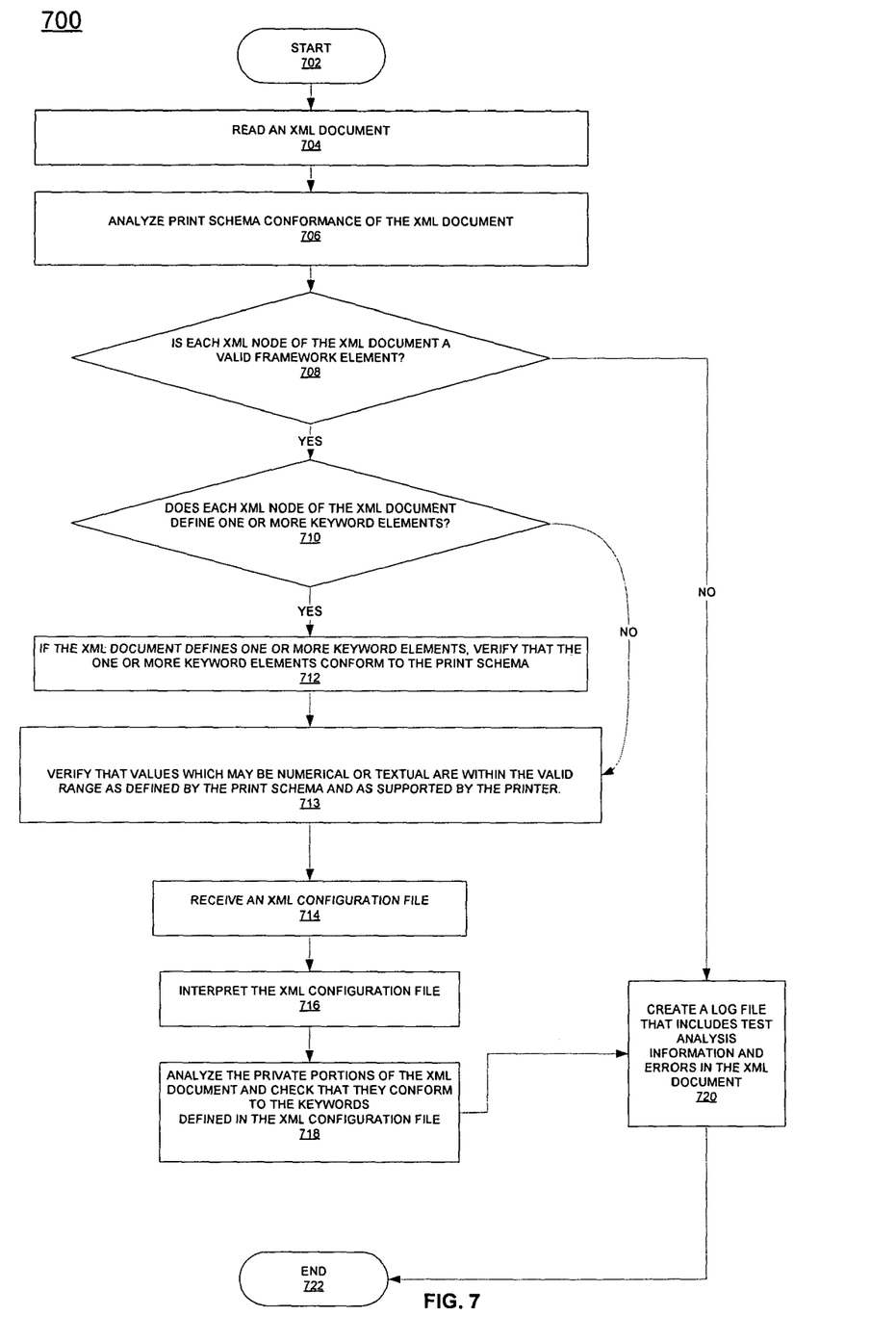
FIG. 7 illustrates a flowchart for validating print schema conformance of an XML document, upon which embodiments in accordance with the present claimed subject matter can be implemented.

FIG. 7 illustrates a flowchart 700 for validating Print Schema conformance of an XML document, upon which embodiments in accordance with the present claimed subject matter can be implemented. Although specific steps are disclosed in flowchart 700, such steps are exemplary. That is, embodiments of the present claimed subject matter are well suited to performing various other or additional steps or variations of the steps recited in flowchart 700. It is appreciated that the steps in flowchart 700 can be performed in an order different than presented. At block 702, the process starts.

At block 704, an XML document is read. In one embodiment, the flowchart 700 is implemented as a command line tool that can run, for example, in a command prompt. The XML document can be a PrintTicket document and/or a PrintCapabilities document.

At block 706, Print Schema conformance of the XML document is analyzed. It is important to note that Print Schema conformance is more than XML schema conformance. While the XML schema is defined by an XSD, the Print Schema is an XML-based format for expressing and organizing a large set of properties that describe, for example, PrintTicket documents and/or PrintCapabilities documents in a hierarchically structured manner while following a set of framework and keyword rules.

At block 708, it is determined whether each node of the XML document is a valid framework element. If yes, the process proceeds to block 710. If no, the process proceeds to block 720. At block 710, it is determined whether each XML node of the XML document defines one or more keyword elements. If yes, the process proceeds to block 712. If no, the process proceeds to block 713. At block 713, it is verified that values which may be numerical or textual are within the valid range as defined by the Print Schema and as supported by the printer. At block 712, it is verified that the keyword elements conform to a Print Schema.

In one embodiment, the method of validating Print Schema conformance of XML documents supports testing for private extensions. In one example, an Independent Hardware Vendor (IHV) using PrintTicket and PrintCapabilities to publish a printer driver's private features and settings desires to use the method described in flowchart 700 to validate the IHV's private extensions. In one embodiment, an XML based configuration file allowing the IHV to describe keywords used in the private extension is received by a software program implementing method 700. The configuration file is interpreted and the private portions of the PrintTicket and/or PrintCapbilities documents are checked for conformance to the keywords described in the configuration file. Blocks 714 through 718 describe this process. At block 714, an XML configuration file is received. At block 716, the XML configuration file is interpreted. At block 718, the private portions of the XML document are analyzed and checked to see if the private portions conform to the keywords defined in the XML configuration file.

At block 720, a log file is created. The log file includes test analysis information and errors in the XML document. At block 722, the process ends.

Figure 8:
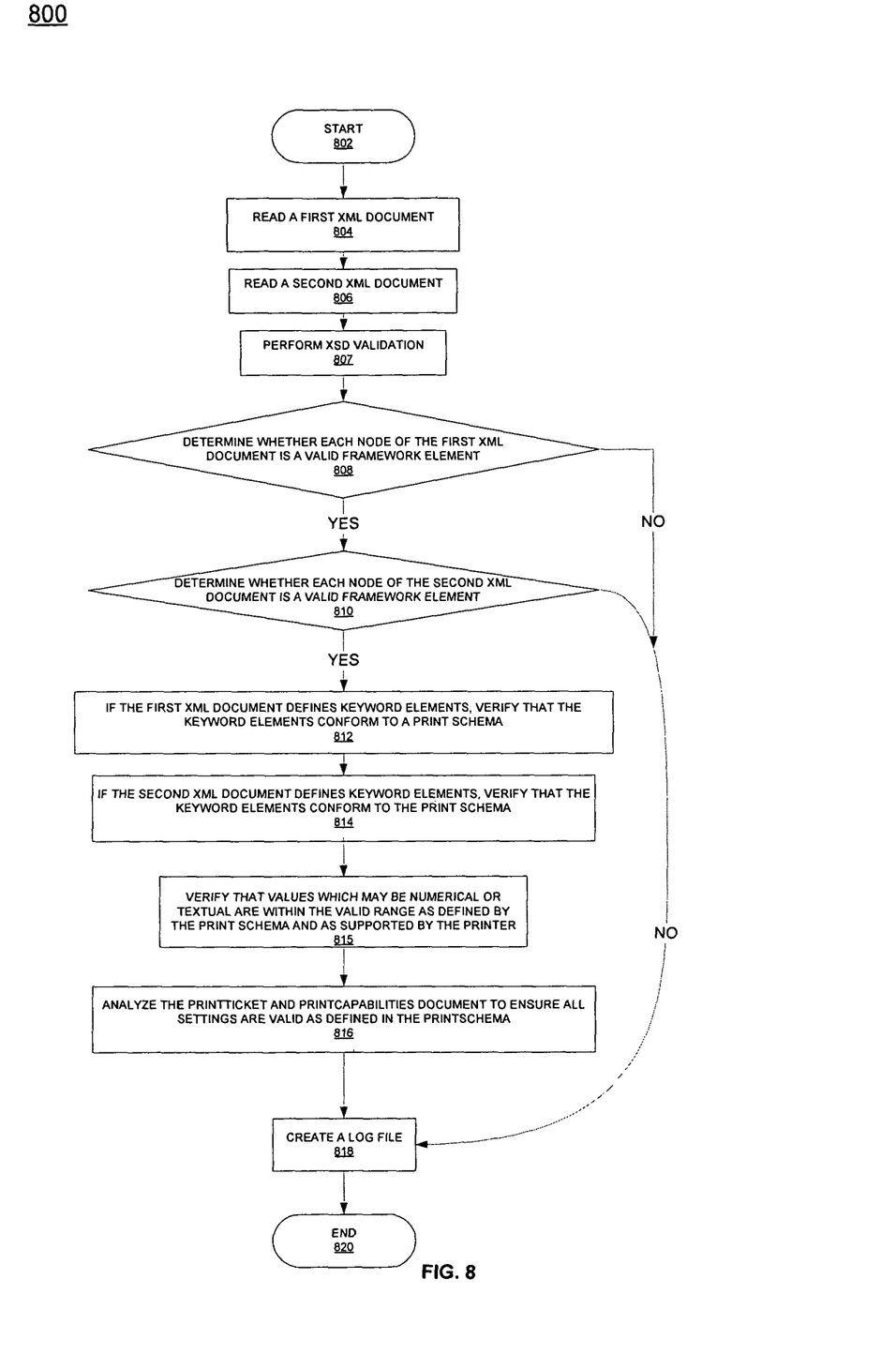
FIG. 8 illustrates a flowchart for verifying syntactical and structural conformity of one or more XML documents, upon which embodiments in accordance with the present claimed subject matter can be implemented.

FIG. 8 illustrates a flowchart 800 for verifying syntactical and structural conformity of one or more XML documents upon which embodiments in accordance with the present claimed subject matter can be implemented. Although specific steps are disclosed in flowchart 800, such steps are exemplary. That is, embodiments of the present claimed subject matter are well suited to performing various other or additional steps or variations of the steps recited in flowchart 800. It is appreciated that the steps in flowchart 800 can be performed in an order different than presented. At block 802, the process starts.

At block 804, a first XML document, such as a PrintTicket document, is read. At block 806, a second XML document, such as a PrintCapabilities document, is read. At block 807, XSD validation is performed.

At block 808, it is determined whether each node of the first XML document (e.g., PrintTicket document) is a valid framework element. If yes, the process proceeds to block 810. If no, the process proceeds to block 818.

At block 810, it is determined whether each node of the second XML document (e.g., PrintCapabilities document) is a valid framework element. If yes, the process proceeds to block 812. If no, the process proceeds to block 818.

At block 812, the keyword elements of the first XML document are verified to conform to a Print Schema. It is important to note that the Print Schema is different from the XML schema. The Print Schema is a superset of XML schema, in one example, the Print Schema includes rules that apply to the PrintTicket specifically but not to XML. In other words, an invalid PrintTicket can be perfectly well formed in the XML sense but fails in the Print Schema sense. The Print Schema, in one example, is a general collection of rules that specify what the structural of a PrintTicket or a PrintCapabilities document should be.

For instance, in one embodiment, Print Schema includes the concept of namespaces. A finite set of elements are supported in the namespace. As a result, if a third party application desires to implement its own private element, it has to be placed in a private namespace to conform to the Print Schema. A document that has a private element placed in a namespace can be well formed in the XML sense but fail in the Print Schema sense.

At block 814, the keyword elements of the second XML document are verified to conform to a Print Schema. At block 815, it is verified that values which may be numerical or textual are within the valid range and defined by the Print Schema and as supported by the printer. At block 816, the PrintTicket and PrintCapabilities document are analyzed to ensure all settings are valid as defined in the Print Schema. At block 818, a log file is created. At block 820, the process ends.

Figure 9:
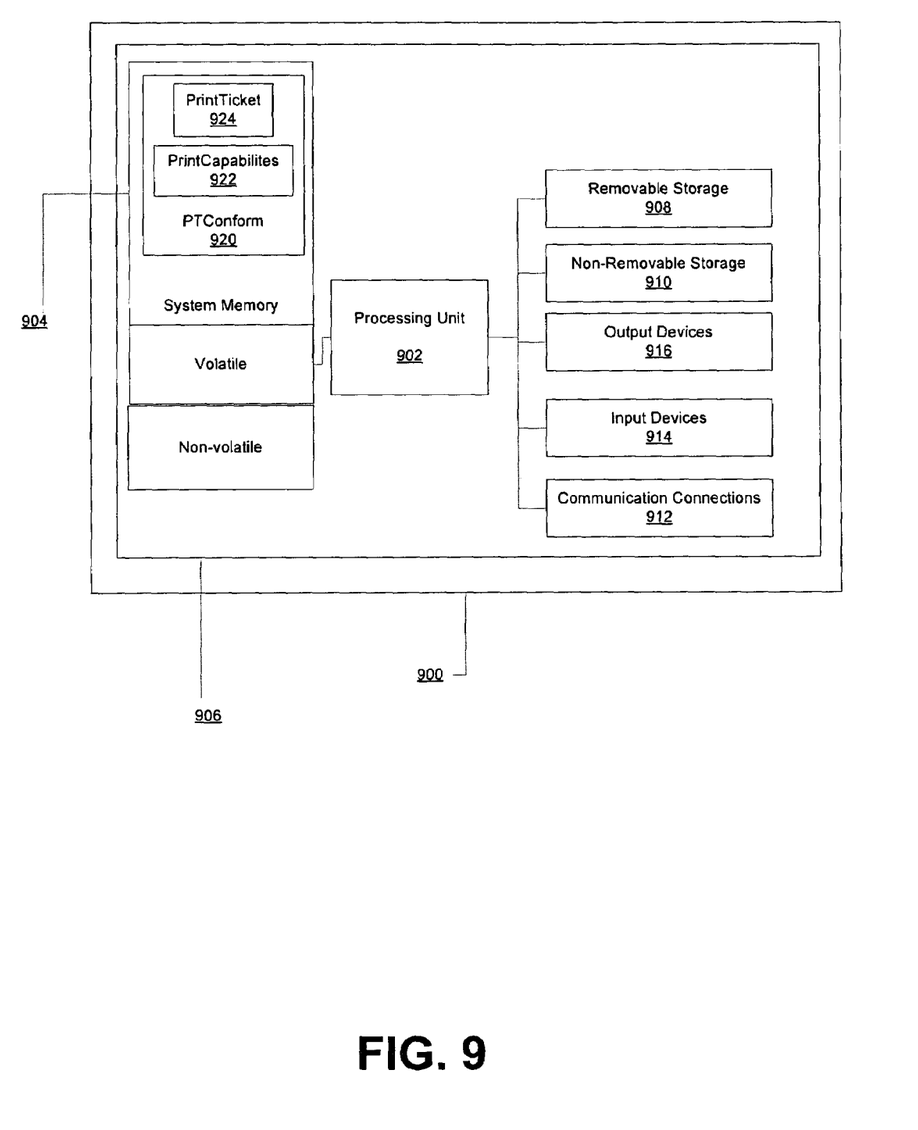
FIG. 9 illustrates an exemplary system for implementing the claimed subject matter includes a computing device.

With reference to FIG. 9, an exemplary system for implementing the claimed subject matter includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media, RAM, ROM, EEPROM flash memory or other memory technology, CD-ROM, digital versatile disks (DVD) or other optical storage, magnetic cassettes, magnetic tape, magnetic disk storage or other magnetic storage devices, which can be used to store the desired information and which can accessed by device 900. Any such computer storage media may be part of device 900.

Device 900 may be utilized to implement various application programs, such as PTConform 920 for verifying whether PrintTicket 924 and PrintCapabilities 922 conform to a Print Schema. In one embodiment, PTConform 920 is executed on a command line interface that usually runs within a Windows® interface. The PTConform 920, after completing its analysis of PrintTicket 924 and PrintCapabilities 922, may generate a log file that includes detailed test analysis information for each Print Schema framework element and Print Schema Keyword element. Errors found during the test run are logged in the log file. In one embodiment, the log file can be displayed using output device 916 and recorded on removable storage 908 and/or non-removable storage 910. Consequently, PTConform 920 allows a software developer to easily check to determine whether PrintTicket 924 and/or PrintCapabilities 922 generated by a new code are conformant. The error statements in the log file specify exactly the nature of the error and enable the software developer to quickly understand and correct the error.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

Hence, embodiments allow print configuration documents (e.g., PrintTicket document and/or PrintCapabilities document) to be efficiently checked for errors. In particular, embodiments allow both software application developers and printer driver developers an easy way to see if the code that corresponds to a new functionality generates Print Schema conformant PrintTicket and/or PrintCapabilities documents.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   reading one or more print configuration documents; and
   analyzing conformance to a print schema of the one or more print configuration documents, the print schema comprising:
      a print schema framework that defines a hierarchically structured collection of print schema element types;
      one or more print schema keywords that define individual instances of print schema framework elements; and
      syntactical and structural rules for the one or more print configuration document;
   the analyzing comprising:
      determining whether the one or more print configuration documents conform to the print schema framework; and
      determining whether the one or more print configuration documents conform to the print schema keyword; and
   generating a file identifying portions of the one or more print configuration documents which fails to conform to the print schema.

2. The method of claim 1, reading comprising:
   reading the one or more print configuration documents node by node; and
   determining that respective nodes comprise an element that conforms to the print schema framework.

3. The method of claim 1, determining whether the one or more print configuration documents conform to the print schema keyword comprising:
   determining whether the print schema keyword is valid in its current context in a print configuration document of the one or more print configuration documents; and
   determining whether the print schema keyword is valid with respect to its parent and child nodes.

4. The method of claim 1 comprising performing XML schema definition based validation.

5. The method of claim 1, the file comprising a log file that comprises test analysis information on the one or more print configuration documents.

6. The method of claim 1, comprising:
   cross referencing a first print configuration document of the one or more print configuration documents with a second print configuration document of the one or more print configuration documents; and
   determining whether one or more settings in the first print configuration document are supported in the second print configuration document.

7. The method of claim 1, comprising:
   receiving an XML configuration file, which allows independent hardware vendors to define keywords used in one or more private portions of the one or more print configuration documents;
   interpreting the XML configuration file; and
   determining whether the one or more private portions conforms to the keywords defined in the XML configuration file.

8. The method of claim 1, the print configuration document comprising a hierarchically structured document.

9. The method of claim 1, the print configuration document comprising an Extensible Markup Language (XML) document.

10. The method of claim 1, the print configuration document comprising a PrintTicket document.

11. The method of claim 1, the print configuration document comprising a PrintCapabilities document.

12. A computer storage media having computer-readable instructions thereon which, when executed, implement a method comprising:
   reading an Extensible Markup Language (XML) based print schema document;
   determining whether the XML based print schema document conforms to a print schema specification, where the print schema specification comprises syntactical and structural rules for the XML based print schema document, comprising:
      determining whether respective XML nodes of the XML document comprise valid framework elements in a defined hierarchically structured collection of XML element types;
      determining whether the XML document defines one or more keyword elements that define individual instances of print schema framework elements;
   if the XML document defines one or more keyword elements, verifying the one or more keyword elements to conform to a print schema; and
   creating a file, which identifies invalid sections of the XML document that fails to conform to the print schema specification.

13. The computer storage media of claim 12, comprising:
   verifying whether the one or more keyword elements are valid in their current context; and
   verifying whether the one or more keyword elements are valid with respect to their parent XML node and child XML node.

14. The computer storage media of claim 12, comprising:
   reading a print capabilities XML document;
   reading a print ticket XML document, which comprises options and settings information for a print queue; and
   analyzing interdependencies between the print capabilities XML document and the print ticket XML document, comprising determining whether a printer setting specified in the print ticket XML document is present in the print capabilities XML document.

15. The computer storage media of claim 12, the file comprising test analysis information for one or more print schema framework elements and one or more print schema keyword elements.

16. A method for verifying syntactical and structural conformity of XML documents, comprising:
   reading a first XML document that comprises a print capabilities XML document;
   reading a second XML document that comprises a print ticket XML document;
   determining whether respective nodes of the first XML document are valid print schema framework elements in a defined hierarchically structured collection of XML element types;
   determining whether respective nodes of second XML document are valid print schema framework elements in the defined hierarchically structured collection of XML element types;
   if the first XML document defines one or more keyword elements that define individual instances of print schema framework elements, verifying whether the one or more keyword elements conform to a print schema;
   if the second XML document defines one or more keyword elements that define individual instances of print schema framework elements, verifying whether the one or more keyword elements conform to the print schema; and
   generating a log file that specifically identifies sections of the first XML document and the second XML document that do not conform to the print schema.

17. The method of claim 16, the print schema defining a language that provides for portability of print ticket and print capabilities documents.

18. The method of claim 16, the print schema specifying how the printing element types are used together.

19. The method of claim 16, comprising performing XML schema definition based validation.

20. The method of claim 16, executed in a command line tool.

* * * * *

UNITED STATES PATENT AND TRADEMARK OFFICE
CERTIFICATE OF CORRECTION

PATENT NO.       : 7,821,667 B2
APPLICATION NO.  : 11/502307
DATED            : October 26, 2010
INVENTOR(S)      : Varun Bahl et al.

Page 1 of 1

It is certified that error appears in the above-identified patent and that said Letters Patent is hereby corrected as shown below:

In column 10, line 64, delete "media." and insert -- media includes, --, therefor.

In column 12, line 13, in Claim 1, delete "document;" and insert -- documents; --, therefor.

In column 13, line 22, in Claim 12, delete "fails" and insert -- fail --, therefor.

In column 14, line 15, in Claim 16, after "of" insert -- the --.

Signed and Sealed this
First Day of February, 2011

David J. Kappos
*Director of the United States Patent and Trademark Office*